US012696835B2

(12) United States Patent
Hou

(10) Patent No.: US 12,696,835 B2
(45) Date of Patent: Aug. 4, 2026

(54) GARDEN TOOL AND PUSH ROD MECHANISM

(71) Applicant: JIANGSU DONGCHENG TOOLS TECHNOLOGY CO., LTD., Nantong (CN)

(72) Inventor: Weiping Hou, Nantong (CN)

(73) Assignee: JIANGSU DONGCHENG TOOLS TECHNOLOGY CO., LTD., Nantong (CN)

( * ) Notice: Subject to any disclaimer, the term of this patent is extended or adjusted under 35 U.S.C. 154(b) by 366 days.

(21) Appl. No.: 18/522,296

(22) Filed: Nov. 29, 2023

(65) Prior Publication Data

US 2024/0090373 A1    Mar. 21, 2024

Related U.S. Application Data

(63) Continuation of application No. PCT/CN2022/114159, filed on Aug. 23, 2022.

(30) Foreign Application Priority Data

Aug. 24, 2021    (CN) .......................... 202110976662.2

(51) Int. Cl.
*A01D 34/68*        (2006.01)
*A01D 34/82*        (2006.01)
(52) U.S. Cl.
CPC ....... *A01D 34/6818* (2013.01); *A01D 34/824* (2013.01); *A01D 34/828* (2013.01)
(58) Field of Classification Search
CPC .............. A01D 34/6818; A01D 34/824; A01D 34/828; A01D 67/00; A01D 34/00
See application file for complete search history.

(56) References Cited

U.S. PATENT DOCUMENTS 7,774,901 B1 *   8/2010   Huang ................. A01G 3/0251
                                                            16/113.1
11,606,900 B2 *   3/2023   Yamaoka ........... A01D 34/6806
(Continued)

FOREIGN PATENT DOCUMENTS

CN        104584762 A        5/2015
CN        205266318 U        6/2016
(Continued)

OTHER PUBLICATIONS

Chinese First Office Action, Chinese Application No. 202110976662. 2, mailed Sep. 29, 2022 (16 pages).
(Continued)

*Primary Examiner* — Arpad Fabian-Kovacs

(57)        ABSTRACT

A garden tool includes an upper push rod, a lower push rod and a control mechanism connected to the upper push rod and the lower push rod. The control mechanism includes a safety switch, an expansion-retraction locking assembly and an operation handle, a trigger configured to trigger the safety switch. The expansion-retraction locking assembly includes a limiting member capable of being operated to enter between the upper push rod and the lower push rod to limit an expansion and retraction of the upper push rod relative to the lower push rod, and a stopping member for holding the limiting member in the limiting state. The operating handle is configured to rotate around a pivot shaft between a first position and a second position. The trigger member and the stopping member are connected to the pivot shaft and driven by the operating handle.

20 Claims, 6 Drawing Sheets

(56) References Cited

U.S. PATENT DOCUMENTS

| | | | | |
|---|---|---|---|---|
| 11,638,397 | B2 * | 5/2023 | Burns, III | A01D 34/824 |
| | | | | 16/437 |
| 12,048,267 | B2 * | 7/2024 | Frick | G05D 1/0246 |
| 12,520,753 | B2 * | 1/2026 | Hiller | A01D 34/824 |
| 12,520,755 | B2 * | 1/2026 | Yamaoka | A01D 34/828 |
| 2014/0102064 | A1 * | 4/2014 | Yamaoka | A01D 34/006 |
| | | | | 56/10.5 |
| 2016/0021819 | A1 * | 1/2016 | Nakano | B25F 5/02 |
| | | | | 30/276 |
| 2019/0104679 | A1 * | 4/2019 | Hamilton | A01D 34/824 |
| 2019/0299795 | A1 * | 10/2019 | Yan | E01H 5/098 |
| 2019/0307066 | A1 | 10/2019 | Jiang | |
| 2020/0000030 | A1 * | 1/2020 | Wei | A01D 75/18 |
| 2021/0086341 | A1 * | 3/2021 | Ho | B25F 5/02 |
| 2022/0408640 | A1 * | 12/2022 | Hiller | A01D 34/68 |
| 2024/0081180 | A1 * | 3/2024 | Driscoll | A01D 34/685 |
| 2024/0122098 | A1 * | 4/2024 | Hou | A01D 34/67 |

FOREIGN PATENT DOCUMENTS

| | | | | | |
|---|---|---|---|---|---|
| CN | 205491816 | U | 8/2016 | | |
| CN | 106625459 | A | 5/2017 | | |
| CN | 108811678 | A | 11/2018 | | |
| CN | 209731958 | U | 12/2019 | | |
| CN | 210610330 | U | 5/2020 | | |
| CN | 113924865 | A | 1/2022 | | |
| EP | 0903074 | A1 | 3/1999 | | |
| EP | 2774470 | A1 * | 9/2014 | | A01D 34/824 |
| WO | WO-2017215604 | A1 * | 12/2017 | | A01D 34/824 |

OTHER PUBLICATIONS

International search report, International Application No. PCT/CN2022/114159, mailed Nov. 16, 2022 (14 pages).

* cited by examiner

GARDEN TOOL AND PUSH ROD MECHANISM

CROSS REFERENCE TO RELATED APPLICATIONS

The present application is a continuation of International Patent Application No. PCT/CN2022/114159, filed Aug. 23, 2022, which claims the priority to Chinese Patent Application No. 202110976662.2 filed Aug. 24, 2021, both of which are herein incorporated by reference in their entireties.

TECHNICAL FIELD

The present disclosure relates to the field of garden tools, in particular to a garden tool, and a push rod mechanism.

BACKGROUND

A garden tool, such as a lawn mower, a snow vehicle, a hand truck or the like, is arranged with an operating rod configured for pushing. The operating rod typically includes a lower push rod connected to two sides of a garden tool body and an upper push rod connected to the lower push rod. The upper push rod is arranged with a grip portion configured for pushing during an operation process of the garden tool.

Taking the lawn mower as an example, when the lawn mower is in operation, the operating rod connected to a lawn mower body extends a certain length to a rear of the lawn mower, such that an operator may work within a safe distance of a certain length away from a cutting tool. When the lawn mower is not in operation, the lawn mower needs to be collected and stored. In order to meet storage requirements, people have designed a folding way or an expansion-retraction way for the operating rod. At the same time, in order to meet safety requirements, a safety switch mechanism has been added during a folding process or an expansion-retraction process, so as to reduce a possibility of accidents. However, an existing technical solution is either too complex in structure, or has a low reliability and potential security risk.

SUMMARY OF THE DISCLOSURE

According to a first aspect of the embodiments of the present disclosure, a garden tool is provided. The garden tool includes an upper push rod and a lower push rod relatively extendible and retractable to the upper push rod; and a control mechanism, connected to the upper push rod and the lower push rod, where the control mechanism includes a safety switch, an expansion-retraction locking assembly, an operating handle, and a trigger member configured to trigger the safety switch, and the expansion-retraction locking assembly includes a limiting member capable of being operated to enter between the upper push rod and the lower push rod to limit an expansion and retraction of the upper push rod relative to the lower push rod, and a stopping member configured to maintain the limiting member in a position-limiting state; the operating handle is configured to rotate around a pivot shaft between a first position and a second position, and the trigger member and the stopping member are connected to the pivot shaft and are driven by the operating handle; in response to the operating handle being in the first position, the stopping member abuts against the limiting member, the upper push rod is fixed relative to the lower push rod, the safety switch is not triggered by the trigger member, and the garden tool is allowed to start; and in response to the operating handle being in the second position, the safety switch is triggered, the stopping member is separated from the limiting member, the upper push rod is movably connected to the lower push rod, and the garden tool is limited from being started.

According to a second aspect of the embodiments of the present disclosure, a garden tool is provided. The garden tool includes: a body; and a push rod mechanism connected to the body. The push rod mechanism includes: an upper push rod and a lower push rod relatively extendible and retractable to the upper push rod; and a control mechanism, connected to the upper push rod and the lower push rod, where the control mechanism includes a safety switch, an expansion-retraction locking assembly, an operating handle, and a trigger member configured to trigger the safety switch, and the expansion-retraction locking assembly includes a limiting member capable of being operated to enter between the upper push rod and the lower push rod to limit an expansion and retraction of the upper push rod relative to the lower push rod, and a stopping member configured to maintain the limiting member in a position-limiting state. The operating handle is configured to rotate around a pivot shaft between a first position and a second position, and the trigger member and the stopping member are connected to the pivot shaft and are driven by the operating handle; in response to the operating handle being in the first position, the stopping member abuts against the limiting member, the upper push rod is fixed relative to the lower push rod, the safety switch is not triggered by the trigger member, and the body is allowed to start; and in response to the operating handle being in the second position, the safety switch is triggered, the stopping member is separated from the limiting member, the upper push rod is movably connected to the lower push rod, and the body is limited from being started.

According to a third aspect of the embodiments of the present disclosure, a push rod mechanism applied to a lawn mower is provided. The push rod mechanism includes: an upper push rod and a lower push rod relatively extendible and retractable to the upper push rod; and a control mechanism, connected to the upper push rod and the lower push rod, where the control mechanism includes a safety switch, an expansion-retraction locking assembly, an operating handle, and a trigger member configured to trigger the safety switch, and the expansion-retraction locking assembly includes a limiting member capable of being operated to enter between the upper push rod and the lower push rod to limit an expansion and retraction of the upper push rod relative to the lower push rod, and a stopping member configured to maintain the limiting member in a position-limiting state; the operating handle is configured to rotate around a pivot shaft between a first position and a second position, and the trigger member and the stopping member are connected to the pivot shaft and are driven by the operating handle; in response to the operating handle being in the first position, the stopping member abuts against the limiting member, the upper push rod is fixed relative to the lower push rod, the safety switch is not triggered by the trigger member, and the garden tool is allowed to start; and in response to the operating handle being in the second position, the safety switch is triggered, the stopping member is separated from the limiting member, the upper push rod is movably connected to the lower push rod, and the garden tool is limited from being started.

BRIEF DESCRIPTION OF THE DRAWINGS

The embodiments of the present disclosure are described in detail below in conjunction with the accompanying drawings.

DETAILED DESCRIPTION

Terms used in the present disclosure are only for the purpose of describing specific embodiments, but not intended to limit the present disclosure. For example, the following terms such as "upper", "lower", "front", "rear" indicating orientation or positional relationships are only based on the orientation or positional relationships shown in the accompanying drawings, for the convenience of describing the present disclosure and simplifying the description, rather than indicating or implying that the device/element referred to must have a specific orientation or be constructed and operated in a specific orientation, and therefore are not to be construed as limiting the present disclosure.

The present disclosure is not limited to the detailed description. Those skilled in the art may easily understand that there are many alternative embodiments of a garden tool of the present disclosure without departing from the principles and scope of the present disclosure. The scope of the present disclosure is defined by the claims.

Figure 1:
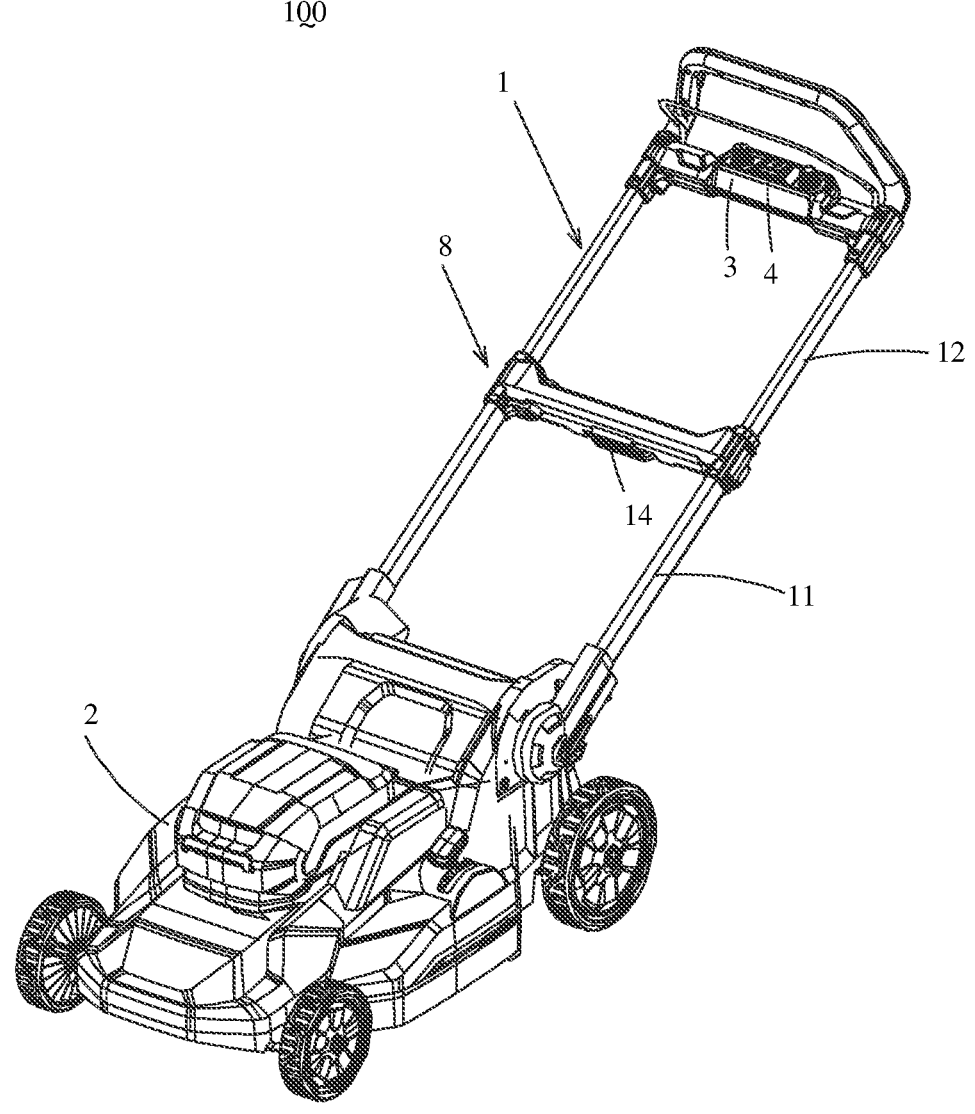
FIG. 1 is an overall structural schematic view of a lawn mower according to an embodiment of the present disclosure.

As shown in FIG. 1, a garden tool provided by the embodiments of the present disclosure is a lawn mower 100. In other embodiments, the garden tool may also be a hand truck, a snow sweeper, or the like.

Figure 2:
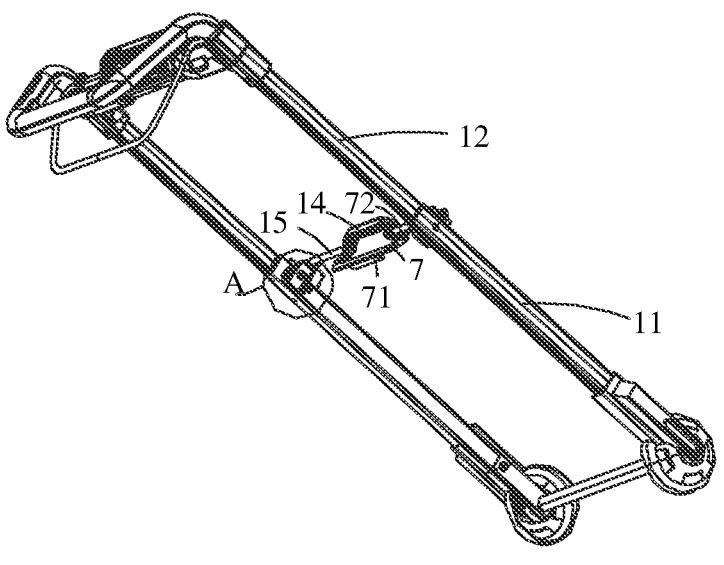
FIG. 2 is a structural schematic view of a push rod and a control mechanism of the lawn mower shown in FIG. 1.

As shown in FIG. 1 and FIG. 2, the lawn mower 100 includes an upper push rod 12 and a lower push rod 11 relatively extendible and retractable to the upper push rod 12, and a control mechanism connected to the upper push rod 12 and the lower push rod 11. The control mechanism includes a safety switch 6, an expansion-retraction locking assembly 8, and an operating handle 14. The control mechanism further includes a trigger member 16 configured to trigger the safety switch 6. The expansion-retraction locking assembly 8 includes a limiting member capable of being operated to enter between the upper push rod 12 and the lower push rod 11 to limit an expansion and retraction of the upper push rod 12 relative to the lower push rod 11, and a stopping member configured to maintain the limiting member in a position-limiting state. The operating handle 14 may be configured to rotate, around a pivot shaft 15, between a first position and a second position. The trigger member 16 and the stopping member are connected to the pivot shaft 15 and are driven by the operating handle 14. When the operating handle 14 is in the first position, the stopping member abuts against the limiting member, such that the upper push rod 12 is fixed relative to the lower push rod 11; the safety switch 6 is not triggered by the trigger member 16, and the lawn mower 100 is allowed to start. When the operating handle 14 is in the second position, the safety switch 6 is triggered, and at the same time, the stopping member is separated from limiting member; the upper push rod 12 is movably connected to the lower push rod 11, and the lawn mower 100 is limited from being started.

The operating handle 14 of the lawn mower 100 rotates between the second position and the first position, such that the safety switch 6 is triggered, and the position limiting of the limiting member is released at the same time, so as to ensure the operation safety of the lawn mower 100. At the same time, the operating handle 14, the trigger member 16 of the safety switch 6, and the stopping member configured to perform an expansion-retraction controlling operation rotate around the same pivot shaft 15, such that at least two operations may be completed synchronously with just one-step operation of the operating handle 14, thereby making the operation simple and the structure exquisite.

The safety switch 6 is a contact switch or a hall switch. In an embodiment, the safety switch 6 is a contact switch. The lawn mower 100 further includes an operating grip 3 located above the control mechanism, and the operating grip 3 is arranged with a start switch 4. The safety switch 6 is connected to the start switch 4 by means of a signal connection. When the safety switch 6 is triggered, the start switch 4 is limited from being started, and the lawn mower 100 cannot perform a mowing operation. However, when the safety switch 6 is not triggered, the start switch 4 is allowed to start, and the user may turn on the start switch 4 to perform the mowing operation.

Figure 3:
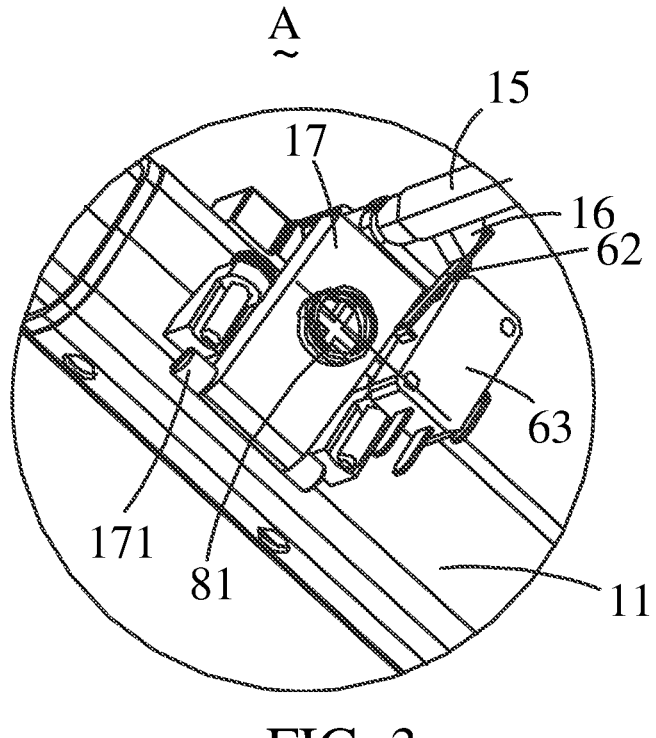
FIG. 3 is an enlarged schematic view of a partial structure of the control mechanism shown in FIG. 2.
Figure 4:
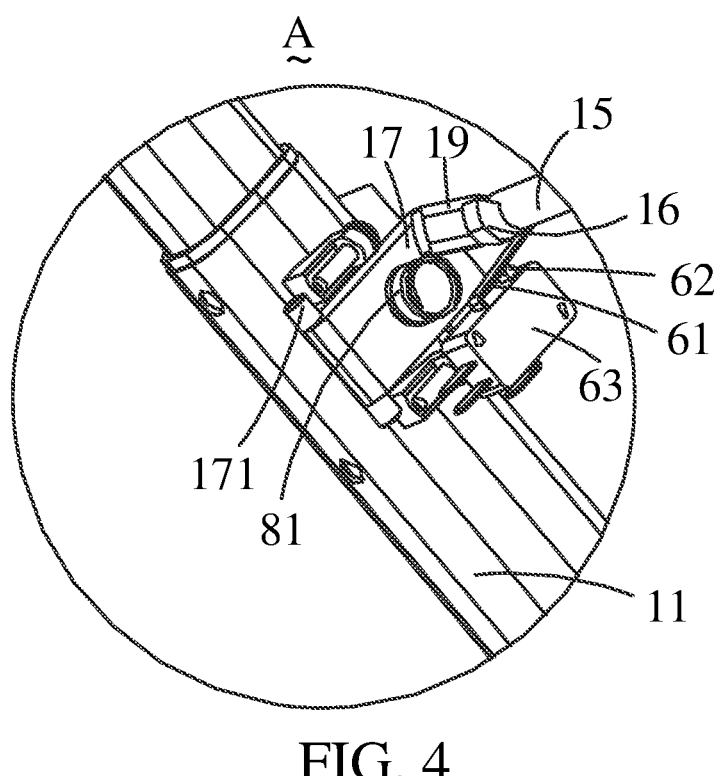
FIG. 4 is an enlarged schematic view of the partial structure shown in FIG. 3 in another state.
Figures 5, 6:
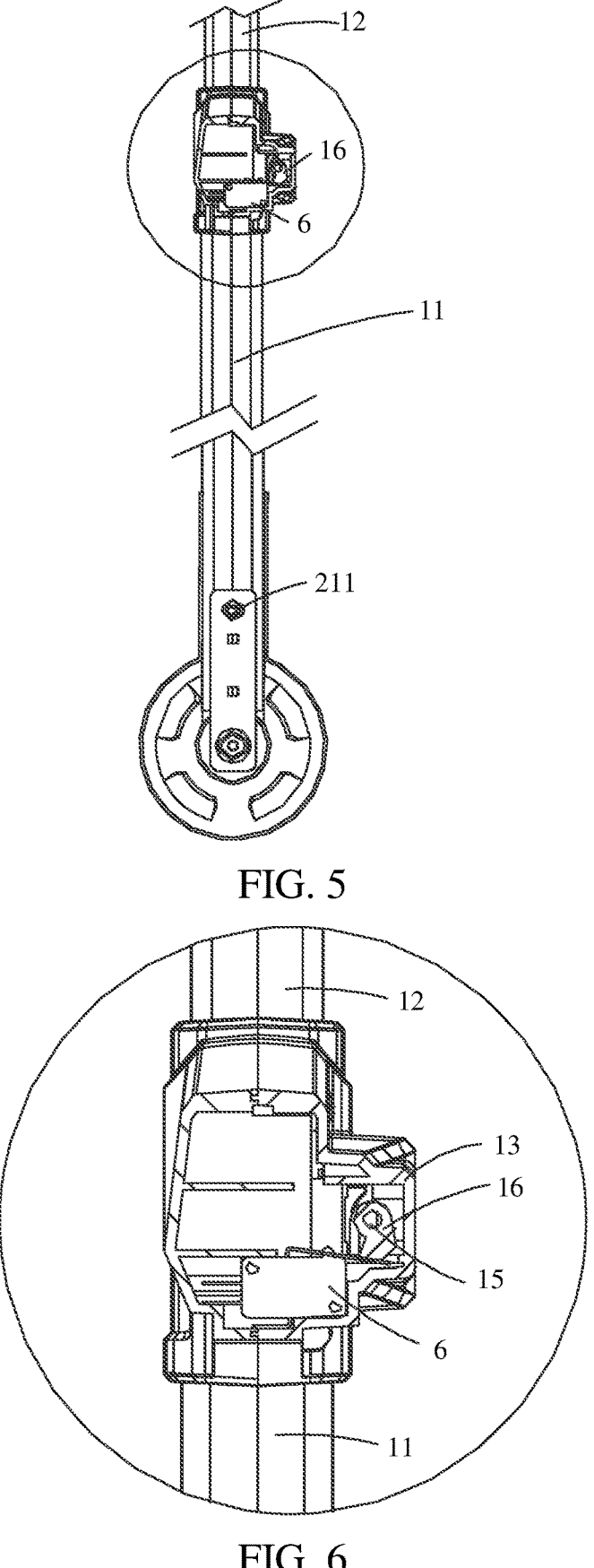
FIG. 5 is a cross-sectional view of the push rod and the control mechanism shown in FIG. 2 in another perspective.
FIG. 6 is an enlarged schematic view of a safety switch and a trigger member of the control mechanism shown in FIG. 5.

As shown in FIGS. 2 to 7, the control mechanism includes a housing 13, the pivot shaft 15 is supported in the housing 13, and the trigger member 16 is formed into a cam protruding radially out of the pivot shaft 15. A rotation radius of the cam changes evenly along a peripheral direction of the pivot shaft 15. When the operating handle 14 is in the second position (as shown in FIG. 3 and FIG. 6), the maximum-radius portion of the cam is in contact with the safety switch 6.

Figure 7:
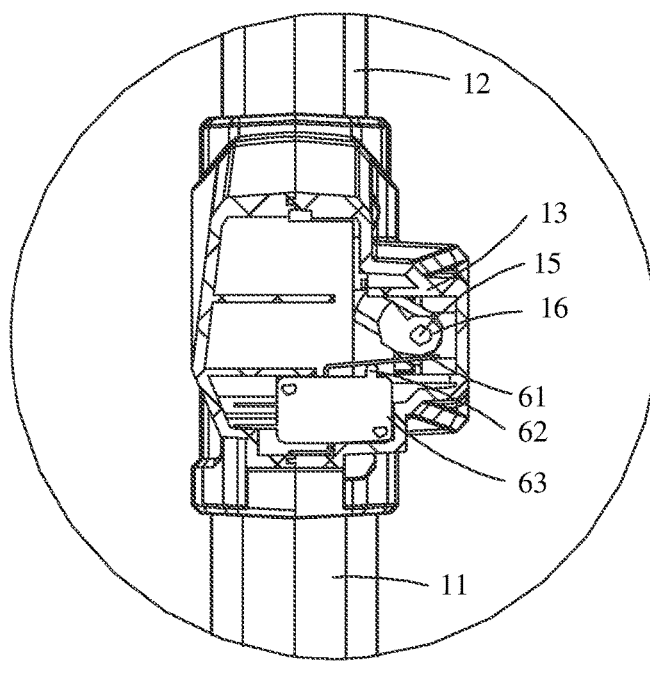
FIG. 7 is an enlarged schematic view of the safety switch and the trigger member shown in FIG. 6 in another state.

The safety switch 6 includes a switch housing 63, a button 62 protruding out of the switch housing 63, and an excitation rod 61 extending outward from the switch housing 63. The excitation rod 61 is located on a top of the button 62. When the operating handle 14 is rotated to the second position, the maximum-radius portion of the cam abuts against the excitation rod 61, so as to trigger the button 62. As the operating handle 14 is rotated to the first position (as shown in FIG. 4 and FIG. 7), the maximum-radius portion of the cam is away from the excitation rod 61 along a peripheral direction of the pivot shaft 15. Instead, the minimum-radius portion faces the excitation rod 61, and thus the safety switch 6 cannot be triggered. Therefore, when the operating handle 14 is fixed to the first position, the safety switch 6 is not triggered, and the lawn mower 100 may be turned on to perform mowing operation.

Two embodiments of the expansion-retraction locking assembly 8 are provided, namely a first locking assembly and a second locking assembly, and both locking assemblies coexist in an embodiment and are linked to the operating handle 14. In other words, the operating handle 14 rotates between the first position and the second position, and thus it not only affects the triggering of the safety switch 6, but also has a consistent limiting or unlocking effect on the first assembly and the second locking assembly.

As shown in FIG. 3, FIG. 4, and FIGS. 8 to 10, in the first locking assembly, the stopping member is a baffle 19 extending radially outward from the pivot shaft 15, and the baffle 19 and the trigger member 16 are arranged at intervals along the axial direction of the pivot shaft 15. The baffle 19 is arranged coaxially with the cam, namely, the trigger member 16, and the baffle 19 and the cam, namely, the trigger member 16, rotate simultaneously as the operating handle 14 rotates.

In this case, the limiting member is a limiting plate 17 pivotally arranged on the housing 13 and a limiting ball 18 received in the limiting plate 17. The lower push rod 11 is arranged with a positioning hole 111 configured to receive the limiting ball 18, and the upper push rod 12 is arranged with a limiting hole 121 configured to receive the limiting ball 18. Only when the upper push rod 12 extends and retracts to a specified position relative to the lower push rod 11, the positioning hole 111 is coincided with the limiting hole 121. When the upper push rod 12 extends and retracts in place, the positioning hole 111 is coincided with the limiting hole 121, and the limiting ball 18 enters between the positioning hole 111 and the limiting hole 121 to limit a relative movement between the upper push rod 12 and the lower push rod 11. It is worth mentioning that, the limiting plate 17 may be pivotally arranged in the housing 13, such that the limiting ball 18 may exit the positioning hole 111 and the limiting hole 121 as the limiting plate 17 moves pivotably, thereby allowing the upper push rod 12 to extend and retract relative to the lower push rod 11. In the embodiment, a plane where a pivot 171 of the limiting plate 17 is located is substantially perpendicular to the pivot shaft 15 of the operating handle 14.

As further shown in FIGS. 3, 4, 9, and 10, the expansion-retraction locking assembly 8 includes an elastic member 81 located between the limiting plate 17 and the housing 13. The elastic member 81 drives the limiting plate 17 to have a tendency to drive the limiting ball 18 to move along a direction close to the positioning hole 111. The elastic member 81 is a compression spring. The compression spring between the housing 13 and the limiting plate 17 has an elastic force that returns to a natural length. The elastic force drives the limiting plate 17 to move along the direction close to the positioning hole 111, such that the limiting ball 18 always has a tendency to enter between the positioning hole 111 and the limiting hole 121 to limit the expansion and retraction of the upper push rod 12 relative to the lower push rod 11. In this way, it may be possible to ensure that the upper push rod 12 and the lower push rod 11 keep in an extended state to reduce a case of being easily retracted.

In addition, in the axial direction of the pivot shaft 15, the baffle 19 and the limiting plate 17 are arranged next/adjacent to each other. When the operating handle 14 is rotated to the first position (as shown in FIG. 4 and FIG. 10), a position of the baffle 19 is coincided with a position of the limiting plate 17 along the peripheral direction of the pivot shaft 15, thereby limiting the limiting plate 17 to move pivotably (i.e., the pivot movement of the limiting plate 17 is limited).

Figure 9:
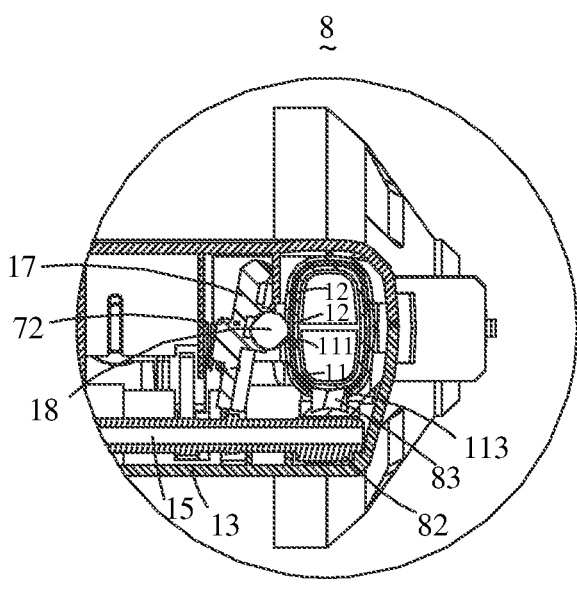
FIG. 9 is an enlarged schematic view of an expansion-retraction locking assembly of the control mechanism shown in FIG. 8.

When the baffle 19 rotates with the operating handle 14, in the peripheral direction of the pivot shaft 15, there are two positions between the baffle 19 and the limiting plate 17, that is, one of the two positions is that the baffle 19 is at least partially coincided with the limiting plate 17, and the other one of the two positions is that the baffle 19 is staggered with the limiting plate 17. When the operating handle 14 is in the first position (as shown in FIG. 4 and FIG. 10), the baffle 19 is coincided with the limiting plate 17, and the baffle 19 limits the limiting plate 17 to move pivotably. In this way, the limiting plate 17 is unable to rotate around the pivot 171 in a direction away from the positioning hole 111, at this time, the limiting ball 18 is fixed between the positioning hole 111 and the limiting hole 121, and the upper push rod 12 cannot perform an expansion-retraction operation relative to the lower push rod 11. When the operating handle 14 is in the second position (as shown in FIG. 3 and FIG. 9), a movable space for the limiting plate 17 is provided by the baffle 19, and the limiting ball 18 is allowed to exit the positioning hole 111. At this time, if the user applies a certain force, the upper push rod 12 is easy to overcome a resistance of the limiting ball 18, such that an edge of the limiting hole 121 crosses the limiting ball 18 and pushes the limiting ball 18 out of the positioning hole 111, thereby achieving the expansion-retraction operation of the upper push rod 12 relative to the lower push rod 11.

Figure 8:
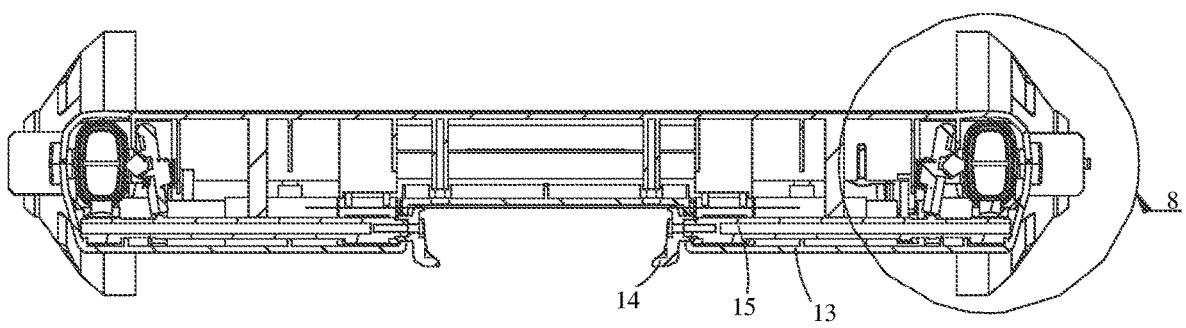
FIG. 8 is a cross-sectional view of the control mechanism shown in FIG. 2 in another perspective.
Figure 10:
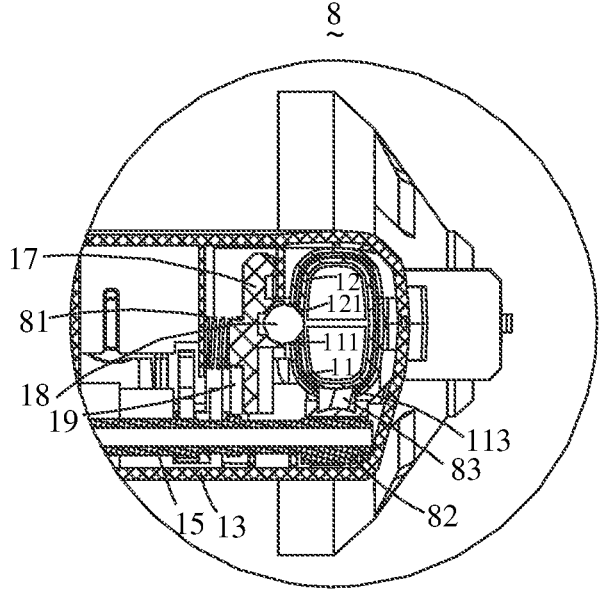
FIG. 10 is an enlarged schematic view of the expansion-retraction locking assembly shown in FIG. 9 in another state.

As further shown in FIG. 8-FIG. 10, in the embodiment, the second expansion-retraction locking assembly may be regarded as a supplement to the first expansion-retraction locking assembly, which has a further stabilizing and strengthening effect on the expansion-retraction locking effect. In other embodiments, the first expansion-retraction locking assembly and the second expansion-retraction locking assembly may be used alternatively to achieve the expansion-retraction locking function independently. In the second expansion-retraction locking assembly, the stopping member is a second cam 82 radially protruding out of the pivot shaft 15. The second cam 82 has a long-diameter portion and a short-diameter portion around the peripheral direction of the pivot shaft 15. When the operating handle 14 is rotated to the first position (as shown in FIG. 10), the long-diameter portion of the second cam 82 faces the lower push rod 11. The long-diameter portion of the cam acts as a pressure abutting against the lower push rod 11 and the upper push rod 12, thereby increasing a friction force required for the upper push rod 12 to extend and retract relative to the lower push rod 11. Furthermore, the second cam 82 is located on an end of the pivot shaft 15, and the second cam 82 is located at a side of the lower push rod 11, the side is adjacent to a side of the lower push rod 11 where the limiting plate 17 is located at. That is, two expansion-retraction locking methods face two different side surfaces of the lower push rod 11, simultaneously play a limiting role, and simultaneously unlock, thereby ensuring the stability of the locking.

In the second expansion-retraction locking assembly, a strip-shaped hole 113 is defined on a side of the lower push rod 11 facing the long-diameter portion and is configured to receive the second cam 82. The limiting member is a flexible member 83 received in the strip-shaped hole 113. When the operating handle 14 is in the first position, the long-diameter portion causes the flexible member 83 to abut against a position between the upper push rod 12 and the lower push rod 11. By arranging the strip-shaped hole 113 and the flexible member 83, it may be possible to facilitate the second cam 82 to play a more significant effect on the upper push rod 12 and the lower push rod 11. In the first position (as shown in FIG. 10), the second cam 82 drives the flexible member 83 to pass through the strip-shaped hole 113 and directly abut against a pipe wall of the upper push rod 12, resulting in a greater force. At the same time, the flexible member 83 is in contact with the pipe wall of the upper push rod 12, so as to increase a blocking effect. In this way, when the operating handle 14 is in the first position, if the user forcibly extends and retracts the upper push rod 12, a strong resistance is generated and it is difficult to achieve the expansion-retraction operation.

Of course, if the user needs to extend and retract the upper push rod 12, it only needs to rotate the operating handle 14 from the first position to the second position (as shown in FIG. 9). At this time, the second cam 82 rotates to the short-diameter portion and contacts the flexible member 83, so that the flexible member 83 no longer abuts against the pipe wall of the upper push rod 12. At the same time, the baffle 19 rotates from a position that the baffle 19 is coincided with the limiting plate 17 in the peripheral direction and axially abuts against the limiting plate 17 to a position that the baffle 19 is staggered with the limiting plate 17 in the peripheral direction, such that two groups of expansion-retraction locking assemblies 8 release the limiting effect between the upper push rod 12 and the lower push rod 11. In this way, the user only needs to apply a certain tension or pressure on the second push rod, so as to overcome the resistance of the limiting ball 18 and squeeze the limiting ball 18 out of the positioning hole 111, and thus the expansion or retraction operation may be performed until the expansion or retraction operation is performed in place. At the same time, the positioning hole 111 is coincided with the limiting hole 121, and the limiting ball 18 enters the positioning hole 111 and the limiting hole 121 again under an elastic force, thereby achieving the fixation of the upper push rod 12 relative to the lower push rod 11. It should be noted that, at this time, the safety switch 6 is triggered by the trigger member 16, and the lawn mower 100 is in a state that cannot start mowing.

Furthermore, if the upper push rod 12 is in the extended position relative to the lower push rod 11 at this time, and the user needs to perform a lawn mowing operation, it only needs to turn the operation handle 14 back to the first position, such that the baffle 19 returns to the position where the limiting plate 17 is limited, and the long-diameter portion of the second cam 82 abuts against a position between the upper push rod 12 and the lower push rod 11 through the flexible member 83, thereby achieving the expansion-retraction locking. At the same time, the short-diameter portion of the cam of the trigger member 16 faces the safety switch 6, and the safety switch 6 is not triggered, which no longer limits the start switch 4 of the lawn mower 100. In this way, the user may start the start switch 4 to perform the lawn mowing operation.

In addition, the control mechanism further includes a suspension member 7 rotating around the pivot shaft 15. The suspension member 7 is arranged with a hook 71, and is arranged on an opposite side of the operation handle 14. A stopper 72 is arranged between the suspension member 7 and the operation handle 14. The suspension member 7 and the operation handle 14 deviate from a certain angle along the peripheral direction of the pivot shaft 15. Only when the operation handle 14 is in the first position, the stopper 72 abuts against the suspension member 7, such that the suspension member 7 is protruded out of the operating handle 14. By arranging the suspension member 7, it may further play a linkage effect of the operating handle 14, such that the push rod mechanism 1 may be connected to a body 2 of the lawn mower 100 during storage, thereby enhancing the stability of the push rod mechanism 1 during storage.

In summary, when the operating handle 14 provided by the present disclosure rotates, the trigger member 16 of the safety switch 6, the baffle 19 of the limiting plate 17, the second cam 82 abutting against the flexible member 83, and the suspension configured to stabilize the push rod mechanism 1 are driven to move synchronously, and thus it has an exquisite structure, a simple operation, and a high stability, thereby ensuring the operation safety and the operation convenience of the lawn mower 100.

According to a first aspect of the embodiments of the present disclosure, a garden tool is provided. The garden tool includes an upper push rod and a lower push rod relatively extendible and retractable to the upper push rod; and a control mechanism, connected to the upper push rod and the lower push rod, where the control mechanism includes a safety switch, an expansion-retraction locking assembly, an operating handle, and a trigger member configured to trigger the safety switch, and the expansion-retraction locking assembly includes a limiting member capable of being operated to enter between the upper push rod and the lower push rod to limit an expansion and retraction of the upper push rod relative to the lower push rod, and a stopping member configured to maintain the limiting member in a position-limiting state; the operating handle is configured to rotate around a pivot shaft between a first position and a second position, and the trigger member and the stopping member are connected to the pivot shaft and are driven by the operating handle; in response to the operating handle being in the first position, the stopping member abuts against the limiting member, the upper push rod is fixed relative to the lower push rod, the safety switch is not triggered by the trigger member, and the garden tool is allowed to start; and in response to the operating handle being in the second position, the safety switch is triggered, the stopping member is separated from the limiting member, the upper push rod is movably connected to the lower push rod, and the garden tool is limited from being started.

In some embodiments, the safety switch is a contact switch or a hall switch.

In some embodiments, the control mechanism includes a housing extending along a front-to-rear direction, the pivot shaft is supported in the housing, the trigger member is formed into a cam protruding radially out of the pivot shaft, a rotation radius of the cam changes uniformly along a peripheral direction of the pivot shaft, and a maximum-radius portion of the cam is in contact with the safety switch in response to the operating handle being in the second position.

In some embodiments, the stopping member includes a baffle extending radially outward from the pivot shaft, and the baffle and the trigger member are arranged separately along an axial direction of the pivot shaft.

In some embodiments, the baffle is arranged coaxially with the trigger member.

In some embodiments, the limiting member includes a limiting plate pivotably arranged on the housing and a limiting ball received in the limiting plate, the lower push rod is arranged with a positioning hole configured to receive the limiting ball, the upper push rod is arranged with a limiting hole configured to receive the limiting ball, and only in response to the upper push rod extending and retracting to a specified position relative to the lower push rod, the positioning hole is coincided with the limiting hole.

In some embodiments, a plane where a pivot of the limiting plate is located is perpendicular to the pivot shaft of the operating handle.

In some embodiments, the expansion-retraction locking assembly includes an elastic member arranged between the limiting plate and the housing, and the elastic member drives the limiting plate to have a tendency to drive the limiting ball to move in a direction close to the positioning hole.

In some embodiments, in the axial direction of the pivot shaft, the baffle and the limiting plate are arranged adjacent to each other, and in response to the operating handle being rotated to the first position, the baffle is coincided with the limiting plate along a peripheral direction of the pivot shaft to limit a pivot movement of the limiting plate.

In some embodiments, in response to the baffle rotating with the operating handle, in the peripheral direction of the pivot shaft, the baffle is at least partially coincided with the limiting plate, or the baffle is staggered with the limiting plate.

In some embodiments, the stopping member includes a second cam projecting radially out of the pivot shaft, the second cam has a long-diameter portion and a short-diameter portion in a peripheral direction of the pivot shaft, and in response to the operating handle being rotated to the first position, the long-diameter portion of the second cam faces the lower push rod.

In some embodiments, a side of the push rod facing the long-diameter portion is arranged with a strip-shaped hole configured to receive the second cam, and the limiting member includes a flexible member received in the strip-shaped hole, and in response to the operating handle being in the first position, the long-diameter portion causes the flexible member to abut against a position between the upper push rod and the lower push rod.

In some embodiments, the control mechanism further includes a suspension member rotating around the pivot shaft, the suspension member is arranged on an opposite side of the operation handle, and a stopper is arranged between the suspension member and the operation handle; and the suspension member and the operation handle deviate from each other by a certain angle along a peripheral direction of the pivot shaft, only in response to the operating handle is in the first position, the stopper abuts against the suspension member, such that the suspension member is protruded out of the operating handle.

In some embodiments, the suspension member is arranged with a hook.

In some embodiments, the expansion-retraction locking assembly includes a first locking assembly and a second locking assembly, and the first locking assembly and the second locking assembly are linked to the operating handle.

In some embodiments, the safety switch includes a switch housing, a button protruding out of the switch housing, and an excitation rod extending outward from the switch housing and located on a top of the button.

In some embodiments, the garden tool further includes an operating grip located above the control mechanism, where the operating grip is arranged with a start switch.

In some embodiments, the operating grip is arranged with a start switch. The safety switch is connected to the start switch by means of a signal connection; in response to the safety switch being triggered, the start switch is limited from being started; in response to the safety switch is not triggered, the start switch is allowed to start.

According to a second aspect of the embodiments of the present disclosure, a garden tool is provided. The garden tool includes: a body; and a push rod mechanism connected to the body. The push rod mechanism includes: an upper push rod and a lower push rod relatively extendible and retractable to the upper push rod; and a control mechanism, connected to the upper push rod and the lower push rod, where the control mechanism includes a safety switch, an expansion-retraction locking assembly, an operating handle, and a trigger member configured to trigger the safety switch, and the expansion-retraction locking assembly includes a limiting member capable of being operated to enter between the upper push rod and the lower push rod to limit an expansion and retraction of the upper push rod relative to the lower push rod, and a stopping member configured to maintain the limiting member in a position-limiting state. The operating handle is configured to rotate around a pivot shaft between a first position and a second position, and the trigger member and the stopping member are connected to the pivot shaft and are driven by the operating handle; in response to the operating handle being in the first position, the stopping member abuts against the limiting member, the upper push rod is fixed relative to the lower push rod, the safety switch is not triggered by the trigger member, and the body is allowed to start; and in response to the operating handle being in the second position, the safety switch is triggered, the stopping member is separated from the limiting member, the upper push rod is movably connected to the lower push rod, and the body is limited from being started According to a third aspect of the embodiments of the present disclosure, a push rod mechanism applied to a lawn mower is provided. The push rod mechanism includes: an upper push rod and a lower push rod relatively extendible and retractable to the upper push rod; and a control mechanism, connected to the upper push rod and the lower push rod, where the control mechanism includes a safety switch, an expansion-retraction locking assembly, an operating handle, and a trigger member configured to trigger the safety switch, and the expansion-retraction locking assembly includes a limiting member capable of being operated to enter between the upper push rod and the lower push rod to limit an expansion and retraction of the upper push rod relative to the lower push rod, and a stopping member configured to maintain the limiting member in a position-limiting state; the operating handle is configured to rotate around a pivot shaft between a first position and a second position, and the trigger member and the stopping member are connected to the pivot shaft and are driven by the operating handle; in response to the operating handle being in the first position, the stopping member abuts against the limiting member, the upper push rod is fixed relative to the lower push rod, the safety switch is not triggered by the trigger member, and the garden tool is allowed to start; and in response to the operating handle being in the second position, the safety switch is triggered, the stopping member is separated from the limiting member, the upper push rod is movably connected to the lower push rod, and the garden tool is limited from being started.

The present disclosure is not limited to the above-mentioned embodiments of the present disclosure. Those skilled in the art may easily understand that there are many alternative solutions of the garden tool of the present disclosure without departing from the principle and purpose of the present disclosure. The scope of the present disclosure is defined by the claims.

What is claimed is:

1. A garden tool, comprising:
an upper push rod and a lower push rod relatively extendible and retractable to the upper push rod; and
a control mechanism, connected to the upper push rod and the lower push rod, wherein the control mechanism comprises a safety switch, an expansion-retraction locking assembly, an operating handle, and a trigger member configured to trigger the safety switch, and the expansion-retraction locking assembly comprises a limiting member capable of being operated to enter between the upper push rod and the lower push rod to limit an expansion and retraction of the upper push rod relative to the lower push rod, and a stopping member configured to maintain the limiting member in a position-limiting state;

wherein the operating handle is configured to rotate around a pivot shaft between a first position and a second position, and the trigger member and the stopping member are connected to the pivot shaft and are driven by the operating handle;

in response to the operating handle being in the first position, the stopping member abuts against the limiting member, the upper push rod is fixed relative to the lower push rod, the safety switch is not triggered by the trigger member, and the garden tool is allowed to start; and in response to the operating handle being in the second position, the safety switch is triggered, the stopping member is separated from the limiting member, the upper push rod is movably connected to the lower push rod, and the garden tool is limited from being started.

2. The garden tool according to claim 1, wherein the safety switch is a contact switch or a hall switch.

3. The garden tool according to claim 2, wherein the control mechanism comprises a housing extending along a front-to-rear direction, the pivot shaft is supported in the housing, the trigger member is formed into a cam protruding radially out of the pivot shaft, a rotation radius of the cam changes uniformly along a peripheral direction of the pivot shaft, and a maximum-radius portion of the cam is in contact with the safety switch in response to the operating handle being in the second position.

4. The garden tool according to claim 1, wherein the stopping member comprises a baffle extending radially outward from the pivot shaft, and the baffle and the trigger member are arranged separately along an axial direction of the pivot shaft.

5. The garden tool according to claim 4, wherein the baffle is arranged coaxially with the trigger member.

6. The garden tool according to claim 3, wherein the limiting member comprises a limiting plate pivotably arranged on the housing and a limiting ball received in the limiting plate, the lower push rod is arranged with a positioning hole configured to receive the limiting ball, the upper push rod is arranged with a limiting hole configured to receive the limiting ball, and only in response to the upper push rod extending and retracting to a specified position relative to the lower push rod, the positioning hole is coincided with the limiting hole.

7. The garden tool according to claim 6, wherein a plane where a pivot of the limiting plate is located is perpendicular to the pivot shaft of the operating handle.

8. The garden tool according to claim 6, wherein the expansion-retraction locking assembly comprises an elastic member arranged between the limiting plate and the housing, and the elastic member drives the limiting plate to have a tendency to drive the limiting ball to move in a direction close to the positioning hole.

9. The garden tool according to claim 6, wherein in the axial direction of the pivot shaft, the baffle and the limiting plate are arranged next to each other, and in response to the operating handle being rotated to the first position, the baffle is coincided with the limiting plate along a peripheral direction of the pivot shaft to limit a pivot movement of the limiting plate.

10. The garden tool according to claim 9, wherein in response to the baffle rotating with the operating handle, in the peripheral direction of the pivot shaft, the baffle is at least partially coincided with the limiting plate, or the baffle is staggered with the limiting plate.

11. The garden tool according to claim 1, wherein the stopping member comprises a second cam projecting radially out of the pivot shaft, the second cam has a long-diameter portion and a short-diameter portion in a peripheral direction of the pivot shaft, and in response to the operating handle being rotated to the first position, the long-diameter portion of the second cam faces the lower push rod.

12. The garden tool according to claim 11, wherein a strip-shaped hole is defined on a side of the push rod facing the long-diameter portion and is configured to receive the second cam, and the limiting member comprises a flexible member received in the strip-shaped hole, and in response to the operating handle being in the first position, the long-diameter portion causes the flexible member to abut against a position between the upper push rod and the lower push rod.

13. The garden tool according to claim 1, wherein the control mechanism further comprises a suspension member rotating around the pivot shaft, the suspension member is arranged on an opposite side of the operation handle, and a stopper is arranged between the suspension member and the operation handle; and the suspension member and the operation handle deviate from each other by a certain angle along a peripheral direction of the pivot shaft, only in response to the operating handle is in the first position, the stopper abuts against the suspension member, such that the suspension member is protruded out of the operating handle.

14. The garden tool according to claim 13, wherein the suspension member is arranged with a hook.

15. The garden tool according to claim 1, wherein the expansion-retraction locking assembly comprises a first locking assembly and a second locking assembly, and the first locking assembly and the second locking assembly are linked to the operating handle.

16. The garden tool according to claim 1, wherein the safety switch comprises a switch housing, a button protruding out of the switch housing, and an excitation rod extending outward from the switch housing and located on a top of the button.

17. The garden tool according to claim 1, further comprising an operating grip located above the control mechanism, wherein the operating grip is arranged with a start switch.

18. The garden tool according to claim 17, wherein the safety switch is connected to the start switch by means of a signal connection;

in response to the safety switch being triggered, the start switch is limited from being started;

in response to the safety switch is not triggered, the start switch is allowed to start.

19. A garden tool, comprising:

a body; and a push rod mechanism connected to the body;

wherein the push rod mechanism comprises:

an upper push rod and a lower push rod relatively extendible and retractable to the upper push rod; and a control mechanism, connected to the upper push rod and the lower push rod, wherein the control mechanism comprises a safety switch, an expansion-retraction locking assembly, an operating handle, and a trigger member configured to trigger the safety switch, and the expansion-retraction locking assembly comprises a limiting member capable of being operated to enter between the upper push rod and the lower push rod to limit an expansion and retraction of the upper push rod relative to the lower push rod, and a stopping member configured to maintain the limiting member in a position-limiting state;

wherein the operating handle is configured to rotate around a pivot shaft between a first position and a second position, and the trigger member and the stopping member are connected to the pivot shaft and are driven by the operating handle;

in response to the operating handle being in the first position, the stopping member abuts against the limiting member, the upper push rod is fixed relative to the lower push rod, the safety switch is not triggered by the trigger member, and the body is allowed to start; and in response to the operating handle being in the second position, the safety switch is triggered, the stopping member is separated from the limiting member, the upper push rod is movably connected to the lower push rod, and the body is limited from being started.

20. A push rod mechanism, applied to a lawn mower, wherein the push rod mechanism comprises:

an upper push rod and a lower push rod relatively extendible and retractable to the upper push rod; and a control mechanism, connected to the upper push rod and the lower push rod, wherein the control mechanism comprises a safety switch, an expansion-retraction locking assembly, an operating handle, and a trigger member configured to trigger the safety switch, and the expansion-retraction locking assembly comprises a limiting member capable of being operated to enter between the upper push rod and the lower push rod to limit an expansion and retraction of the upper push rod relative to the lower push rod, and a stopping member configured to maintain the limiting member in a position-limiting state;

wherein the operating handle is configured to rotate around a pivot shaft between a first position and a second position, and the trigger member and the stopping member are connected to the pivot shaft and are driven by the operating handle;

in response to the operating handle being in the first position, the stopping member abuts against the limiting member, the upper push rod is fixed relative to the lower push rod, the safety switch is not triggered by the trigger member, and the garden tool is allowed to start; and in response to the operating handle being in the second position, the safety switch is triggered, the stopping member is separated from the limiting member, the upper push rod is movably connected to the lower push rod, and the garden tool is limited from being started.

\* \* \* \* \*